(12) United States Patent
Naganuma et al.

(10) Patent No.: US 9,528,624 B2
(45) Date of Patent: Dec. 27, 2016

(54) SHUTOFF VALVE DEVICE

(75) Inventors: Naoto Naganuma, Nara (JP); Yuji Nakabayashi, Nara (JP); Hideaki Morihana, Nara (JP); Masaki Sugiyama, Kyoto (JP); Hiroshi Nakai, Nara (JP); Akihisa Adachi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 13/983,743

(22) PCT Filed: Jan. 19, 2012

(86) PCT No.: PCT/JP2012/000326
§ 371 (c)(1),
(2), (4) Date: Aug. 5, 2013

(87) PCT Pub. No.: WO2012/108130
PCT Pub. Date: Aug. 16, 2012

(65) Prior Publication Data
US 2013/0306893 A1 Nov. 21, 2013

(30) Foreign Application Priority Data

Feb. 9, 2011 (JP) .................................. 2011-026490

(51) Int. Cl.
*F16K 31/02* (2006.01)
*F16K 31/04* (2006.01)
(Continued)

(52) U.S. Cl.
CPC ........ *F16K 31/046* (2013.01); *F02M 21/0242* (2013.01); *F16K 31/04* (2013.01);
(Continued)

(58) Field of Classification Search
CPC ...... F16K 31/046; F16K 31/047; F16K 31/04; F02M 21/0242; G01F 15/005; F23N 2035/24; F23N 2035/14; Y02T 10/32; F16H 2025/249
(Continued)

(56) References Cited

U.S. PATENT DOCUMENTS 2,860,266 A * 11/1958 Schrader ........................ 310/112
3,081,644 A * 3/1963 Hudgens et al. ............ 74/89.42
(Continued)

FOREIGN PATENT DOCUMENTS

| CN | 1497203 A | 5/2004 |
|---|---|---|
| CN | 1573189 A | 2/2005 |

(Continued)

OTHER PUBLICATIONS

Office Action and Search Report, and partial translation thereof, in corresponding Chinese Application No. 201280008489.6, dated Jul. 1, 2014, 9 pages.

(Continued)

*Primary Examiner* — John Bastianelli
*Assistant Examiner* — Andrew J Rost
(74) *Attorney, Agent, or Firm* — Brinks Gilson & Lione

(57) ABSTRACT

A shutoff valve according to the present invention includes: a motor configured to cause a rotating shaft to rotate; a lead screw formed on the rotating shaft; a lead nut into which the lead screw is screwed; and a valve element configured to block a passage, the valve element being configured to move in an axial direction in accordance with rotation of the rotating shaft. A dry lubricating coating is formed on a contact surface where the lead screw and the lead nut come into contact with each other. A thread pitch of the lead screw is set such that a current applied to the motor, the current being in relation to an inductance of the motor, is in a range (Continued)

that does not cause explosion of the fuel gas and that allows thrust force necessary for moving the valve element to be obtained.

7 Claims, 6 Drawing Sheets

(51) Int. Cl.
*F02M 21/02* (2006.01)
*G01F 15/00* (2006.01)
*F16H 25/24* (2006.01)

(52) U.S. Cl.
CPC .......... *F16K 31/047* (2013.01); *G01F 15/005* (2013.01); *F16H 2025/249* (2013.01); *F23N 2035/14* (2013.01); *F23N 2035/24* (2013.01); *Y02T 10/32* (2013.01)

(58) Field of Classification Search
USPC ......... 251/129.11, 129.12, 129.13, 226, 227, 251/215
See application file for complete search history.

(56) References Cited

U.S. PATENT DOCUMENTS

| | | | | |
|---|---|---|---|---|
| 4,723,754 A | * | 2/1988 | Torimoto et al. | 251/129.05 |
| 5,769,390 A | * | 6/1998 | Ando | 251/129.11 |
| 7,007,923 B2 | * | 3/2006 | Dorigo et al. | 251/129.11 |
| 7,165,755 B2 | * | 1/2007 | Umezawa et al. | 251/129.11 |
| 7,871,059 B2 | * | 1/2011 | Nalini et al. | 251/129.11 |
| 8,616,522 B2 | * | 12/2013 | Weldon et al. | 251/129.11 |
| 8,851,448 B2 | * | 10/2014 | Harada et al. | 251/129.11 |
| 2006/0180780 A1 | | 8/2006 | Arai et al. | |
| 2011/0023513 A1 | * | 2/2011 | Hamel et al. | 251/129.11 |
| 2014/0291562 A1 | * | 10/2014 | Ooe et al. | 251/129.11 |

FOREIGN PATENT DOCUMENTS

| | | |
|---|---|---|
| CN | 1821632 A | 8/2006 |
| JP | 07-245931 A | 9/1995 |
| JP | 10-281324 A | 10/1998 |
| JP | 11-241668 A | 9/1999 |
| JP | 2003-202259 A | 7/2003 |
| JP | 2004-347021 A | 12/2004 |
| JP | 2006-300334 A | 11/2006 |
| JP | 2006-317004 A | 11/2006 |
| JP | 2008-267464 A | 11/2008 |

OTHER PUBLICATIONS

International Search Report for International Application No. PCT/JP2012/000326, dated Apr. 17, 2012, 2 pages.

* cited by examiner

SHUTOFF VALVE DEVICE

This application is a 371 application of PCT/JP2012/000326 having an international filing date of Jan. 19, 2012, which claims priority to JP2011-026490 filed Feb. 9, 2011, the enter contents of which are incorporated herein by reference.

TECHNICAL FIELD

The present invention relates to a shutoff valve device included in a flow rate measuring device configured to measure the flow rate of a fuel gas flowing through a passage, the shutoff valve device serving to shut off the passage.

BACKGROUND ART

In recent years, gas meters have various safety functions in order to secure proper and safe gas usage. In particular, such a gas meter is configured to shut off the gas when necessary by means of a shutoff valve included in the gas meter. To be specific, if a microcomputer included in the gas meter determines that the current state is abnormal based on a result of sensing by a flow sensor, seismic sensor, pressure sensor, gas leak alarm, or the like, then the gas is shut off by the shutoff valve (see Patent Literature 1, for example).

Shutoff valves using a PM stepping motor as a driving source, which are capable of realizing relatively strong closing force and returning force and capable of maintaining its state when non-energized, are attracting attention. In particular, a shutoff valve having an air-tight partition wall and including a rotor inside a gas passage and a stator outside the gas passage is attracting attention.

Some of the existing installed gas meters are not provided with such a shutoff valve as mentioned above. The necessity of installing a shutoff valve in such gas meters including no shutoff valve has been examined not only for safety purposes but also for the purpose of stopping gas supply to non-paying gas customers.

PTL 1: Japanese Laid-Open Patent Application Publication No. 2003-202259

SUMMARY OF THE INVENTION

Technical Problem

However, there are gas meters in which a passage extending from a gas inlet through a flow rate measuring unit to a gas outlet is not provided independently. These gas meters may be configured such that once gas enters the gas meter through the inlet, the gas is released inside the casing of the gas meter, and is then introduced into the flow rate measuring unit. If a shutoff valve is provided inside such a gas meter near the inlet, then the entire shutoff valve is exposed to the gas. That is, a part of a motor operating to cause the valve element of the shutoff valve to move relative to the valve seat, the part receiving a current (e.g., a stator), is also disposed at a position exposed to the gas.

For this reason, the shutoff valve needs to be configured so as to be usable not only in a normal form of use where the stator to which a current is applied is positioned outside the passage but also in other form of use where the entire shutoff valve is exposed to the gas. That is, the configuration of the shutoff valve needs to be one that assures safety in terms of prevention of gas ignition.

One conceivable configuration for preventing gas ignition is such that the entire shutoff valve is sealed up so that sparks from a motor driving the shutoff valve will not come into contact with the gas. However, in the case of adopting such a configuration, for example, additional members for sealing up the shutoff valve are necessary. That is, significant changes in the configuration of the shutoff valve become necessary. In terms of production costs, it is preferable if a shutoff valve configuration intended for a normal form of use need not be altered to a great degree even when applied in a form of use in which the entire shutoff valve is exposed to the gas. Thus, there is a demand for a shutoff valve that is capable of preventing gas ignition and assuring safety without requiring a large degree of design changes.

Moreover, since a gas meter operates with a built-in battery therein, and is required to continue operating (for maximum 20 years) without battery replacement until the time for replacement of the gas meter arrives. Accordingly, the shutoff valve is required to operate with a battery voltage, in particular, a voltage that does not cause gas ignition.

If the shutoff valve disclosed in Patent Literature 1 is installed in an existing gas meter, there is a problem that a current or the like to be applied may become an igniting factor.

The present invention has been made in view of the above-described problems. An object of the present invention is to realize a shutoff valve device capable of operating with current and voltage values in such value ranges as not to cause ignition in a fuel gas.

Solution to Problem

In order to solve the above-described problems, a shutoff valve device according to one aspect of the present invention is a shutoff valve device included in a flow rate measuring device configured to measure a flow rate of a fuel gas flowing through a passage, and the shutoff valve device serves to shut off the passage. The shutoff valve device includes: a motor configured to cause a rotating shaft to rotate; a male screw portion formed on the rotating shaft; and a valve element configured to block the passage, the valve element including a female screw portion into which the male screw portion is screwed, the valve element being configured to move in an axial direction in accordance with rotation of the rotating shaft. A dry lubricating coating is formed on a contact surface where the male screw portion and the female screw portion come into contact with each other. A thread pitch of the male screw portion is set such that a current applied to the motor, the current being in relation to an inductance of the motor, is in a range that does not cause explosion of the fuel gas and that allows thrust force necessary for moving the valve element to be obtained.

Accordingly, the shutoff valve device according to the present invention provides an advantageous effect that the shutoff valve device is capable of operating with current and voltage values in such value ranges as not to cause ignition in the fuel gas.

Advantageous Effects of the Invention

The shutoff valve device according to the present invention is configured as described above, and provides an advantageous effect that the shut off valve device is capable of operating with current and voltage values in such value ranges as not to cause ignition in the fuel gas.

DETAILED DESCRIPTION OF THE PREFERRED EMBODIMENTS

Figure 1:
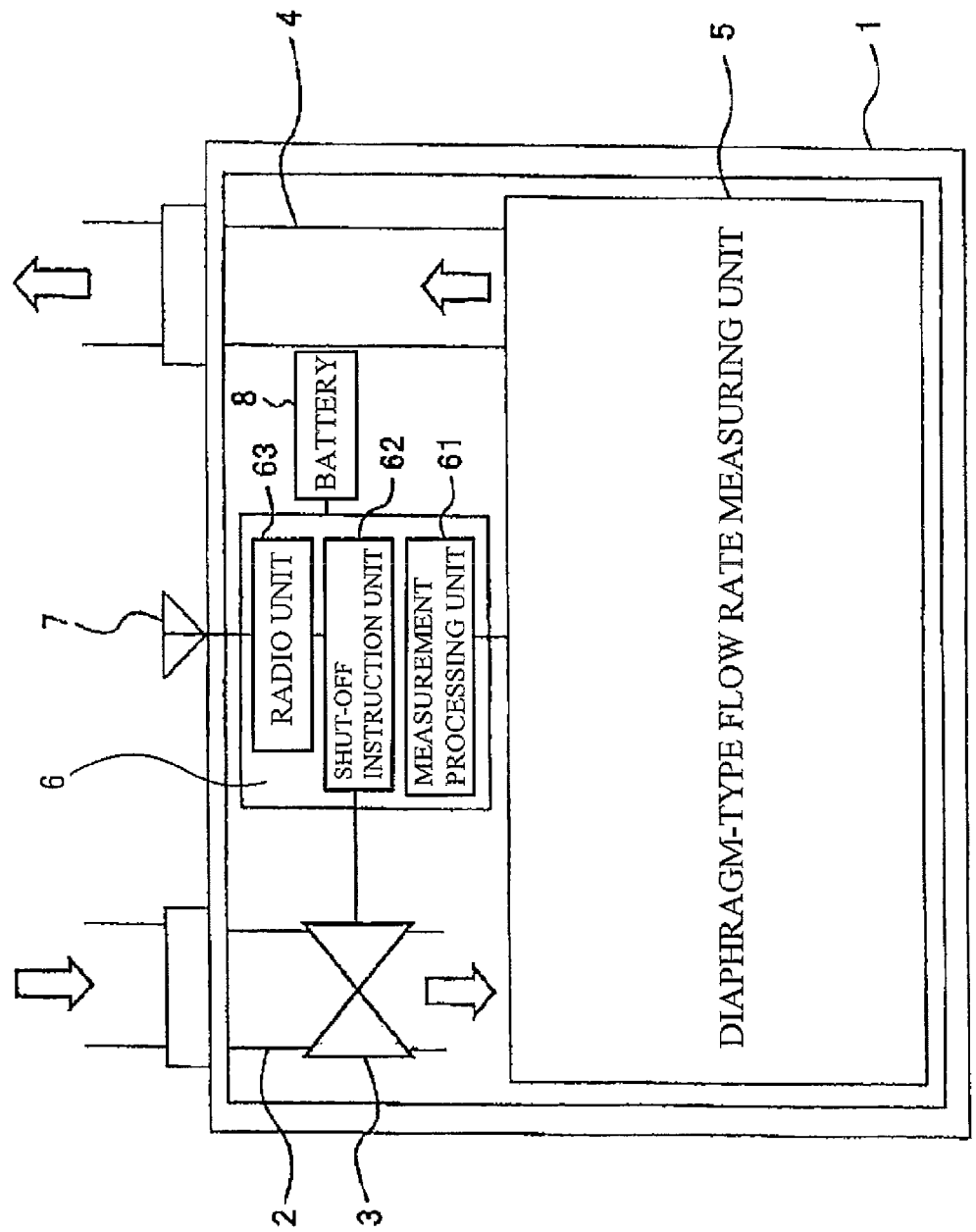
FIG. 1 is a schematic diagram showing an example of a main part configuration of a gas measuring device according to an embodiment of the present invention.

A shutoff valve device according to an embodiment of the present invention is a shutoff valve device included in a flow rate measuring device configured to measure a flow rate of a fuel gas flowing through a passage, and the shutoff valve device serves to shut off the passage. The shutoff valve device includes: a motor configured to cause a rotating shaft to rotate; a male screw portion formed on the rotating shaft; and a valve element configured to block the passage, the valve element including a female screw portion into which the male screw portion is screwed, the valve element being configured to move in an axial direction in accordance with rotation of the rotating shaft. A dry lubricating coating is formed on a contact surface where the male screw portion and the female screw portion come into contact with each other. A thread pitch of the male screw portion is set such that a current applied to the motor, the current being in relation to an inductance of the motor, is in a range that does not cause explosion of the fuel gas and that allows thrust force necessary for moving the valve element to be obtained.

The dry lubricating coating herein is a film formed of a solid substance having lubricity. Examples of the solid substance having lubricity include: fluorocarbon resins such as molybdenum disulfide, graphite, mica, and polytetrafluoroethylene; and soft metals.

According to the above configuration, the dry lubricating coating is formed on the contact surface where the male screw portion and the female screw portion come into contact with each other. This makes it possible to reduce a coefficient of dynamic friction occurring at the contact surface. If grease or oil is used instead of the dry lubricating coating, there is a risk that its viscosity increases due to aging degradation such as oxidation, resulting in reduced lubricity. However, since the lubricating coating is dry, the lubricating coating reduces the frictional resistance with no aging degradation.

Further, the thread pitch of the male screw portion is set such that the relationship between the current applied to the motor and the inductance of the motor is in a range that does not cause explosion of the fuel gas and that allows thrust force necessary for moving the valve element to be obtained.

For example, IEC60079-11: 1999, Electrical apparatus for explosive gas atmospheres—Part 11: Intrinsic safety "i" may be used to set the range of a relationship among a current applied to the motor, a voltage applied to the motor, and an inductance of the motor, the range not causing explosion of the fuel gas. Alternatively, other intrinsic safety standards such as the Japanese Industrial Standards may be used to set the range of the relationship.

It should be noted that intrinsic safety is standards tested or confirmed by public institutions as follows: when the intrinsic safety standards are met, sparks occurring in a normal state and at an accident as well as high-temperature portions do not cause ignition of the gas. That is, the standards are applied to devices in which a circuit included in a shutoff valve has been confirmed to be incapable of causing an explosion in a gas environment (explosive atmosphere).

The thrust force for moving the valve element, the thread pitch of the male screw portion, a coefficient of dynamic friction, and a motor torque are related to one another as described below. Specifically, in a case where the pitch and the coefficient of dynamic friction are reduced, the thrust force for moving the valve element can be maintained to be constant even if the motor torque is reduced. That is, by reducing the pitch and the coefficient of dynamic friction, the thrust force for moving the valve element can be maintained even if the current (and voltage) applied to the motor is reduced.

As described above, the current and voltage applied to the motor can be reduced by suitably setting the pitch. Accordingly, the shutoff valve device according to the embodiment of the present invention allows the current and voltage applied to the motor to fall within a range that does not cause explosion of the fuel gas.

Thus, the shutoff valve device according to the embodiment of the present invention provides an advantageous effect that the shut off valve device is capable of operating with current and voltage values in such value ranges as not to cause ignition in the fuel gas.

Preferably, in the shutoff valve device according to the embodiment of the present invention, a value of the inductance of the motor is 5 to 50 mH, and a maximum value of the current applied to the motor, the current being in the range that does not cause explosion of the fuel gas and that allows thrust force necessary for moving the valve element to be obtained, is in a range from 80 to 250 mA.

Preferably, in the shutoff valve device according to the embodiment of the present invention, the thread pitch is set to be in a range from 0.3 to 1 mm.

The shutoff valve device according to the embodiment of the present invention is a shutoff valve device included in a flow rate measuring device configured to measure a flow rate of a fuel gas flowing through a passage, and the shutoff valve device serves to shut off the passage. The shutoff valve device includes: a motor configured to cause a rotating shaft to rotate; a male screw portion formed on the rotating shaft; and a valve element configured to block the passage, the valve element including a female screw portion into which the male screw portion is screwed, the valve element being configured to move in an axial direction in accordance with rotation of the rotating shaft. A dry lubricating coating is formed on a contact surface where the male screw portion and the female screw portion come into contact with each other. An inductance of the motor is in a range from 5 to 50 mH, and a resistance value of an internal resistance of the motor is in a range from 8 to 15Ω. Based on the range of the inductance and the range of the resistance value, a maximum value of a current applied to the motor is set to be in a range from 80 to 250 mA as a range that does not cause explosion of the fuel gas and that allows thrust force necessary for moving the valve element to be obtained, and a thread pitch of the male screw portion is set to be in a range from 0.3 to 1 mm.

According to the above configuration, in a case where the inductance of the motor is in a range from 5 to 50 mH, and the resistance value of the internal resistance of the motor is in a range from 8 to 15Ω, the maximum value of the current applied to the motor is set to be in a range from 80 to 250 mA, and the thread pitch of the male screw portion is set to be in a range from 0.3 to 1 mm. Accordingly, the shutoff valve device provides an advantageous effect that the shut off valve device is capable of operating with a current value, voltage value, and inductance in such ranges as not to cause ignition in the fuel gas.

Preferably, in the shutoff valve device according to the embodiment of the present invention, the dry lubricating coating is formed of a fluorocarbon resin whose particle diameter is smaller than a gap formed between a male screw thread and a female screw thread at the contact surface.

Further, in the shutoff valve device according to the embodiment of the present invention, the motor may be a stepping motor. The shutoff valve device may include: a current application module configured to apply a pulse current to the motor; and a changing module configured to change a rotational speed of the motor by changing the number of pulses and frequency of the pulse current applied by the current application module.

Since the above configuration includes the current application module and the changing module, the number of pulses and frequency of the pulse current to be applied to the motor can be changed, and the rotational speed of the motor can be changed.

The stepping motor herein has characteristics that the motor torque increases in accordance with a decrease in the rotational speed, and the motor torque decreases in accordance with an increase in the rotational speed. Since the shutoff valve device according to the present invention is capable of freely changing the rotational speed of the motor, the thrust force can be controlled by controlling the rotational speed.

Thus, the shutoff valve device according to the embodiment of the present invention is capable of controlling the thrust force for moving the valve element while maintaining a current value, voltage value, and inductance in such ranges as not to cause ignition in the fuel gas.

Hereinafter, the embodiment of the present invention is described in detail with reference to the accompanying drawings. In the drawings, the same or corresponding components are denoted by the same reference signs, and a repetition of the same description is avoided.

(Gas Measuring Device)

First, the configuration of a gas measuring device (flow rate measuring device) 1 according to the present embodiment is described with reference to FIGS. 1 and 2.

FIG. 1 is a schematic diagram showing an example of a main part configuration of the gas measuring device 1 according to the present embodiment.

Figure 2:
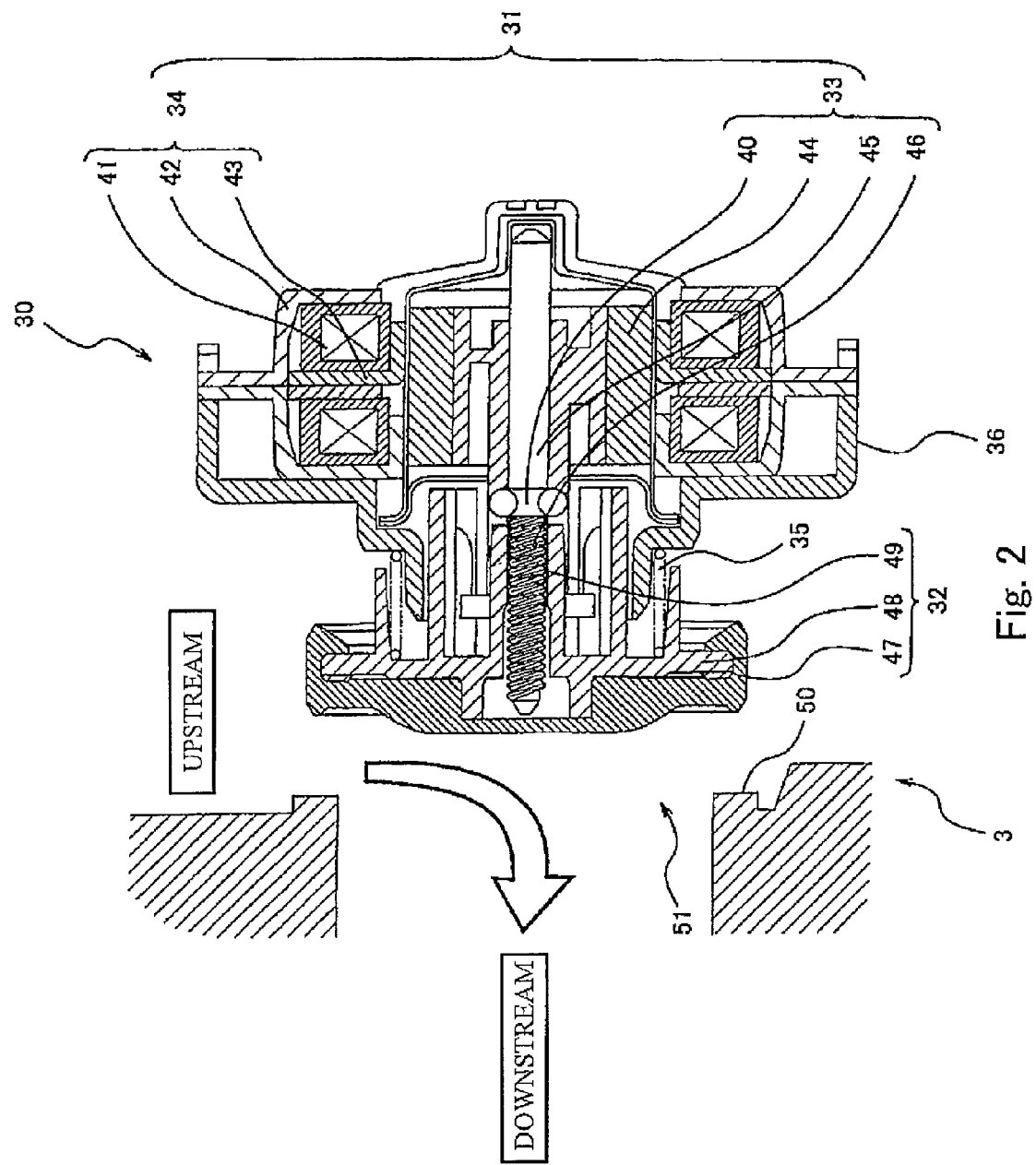
FIG. 2 is a cross-sectional view showing an example of a valve-opened state of a shutoff valve included in the gas measuring device shown in FIG. 1.

FIG. 2 is a cross-sectional view showing an example of a valve-opened state of a shutoff valve included in the gas measuring device 1 shown in FIG. 1.

The gas measuring device 1 according to the present embodiment is disposed on gas piping for supplying a fuel gas. While the gas measuring device 1 is operating (being used), the gas measuring device 1 calculates a cumulative value of a gas flow rate as the amount of gas usage. The gas measuring device 1 can detect an abnormality in the gas flow rate, and output an abnormality alarm and/or shut off a gas passage.

As shown in FIG. 1, the gas measuring device 1 includes: an inlet passage 2; a shut-off unit 3; an outlet passage 4; a diaphragm-type flow rate measuring unit 5; a measuring device controller 6; a radio antenna 7; and a battery 8. It should be noted that the gas enters the inside of the gas measuring device 1 through the inlet passage 2, and flows out of the gas measuring device 1 through the outlet passage 4 which is in communication with the diaphragm-type flow rate measuring unit 5.

The inlet passage 2 is a cylindrical pipe for allowing the gas supplied to a consumer to flow into the gas measuring device 1. As shown in FIG. 1, the shut-off unit 3 is provided at an end portion of the inlet passage 2.

The shut-off unit 3 is a mechanism configured to block the inlet passage 2 to shut off the flow of the gas in accordance with an instruction received from the outside by radio. The shut-off unit 3 is detachably attached to the downstream end of the inlet passage 2. As shown in FIG. 2, the shut-off unit 3 includes: a valve seat 50 formed within the inlet passage 2 and having an O-ring cross section; and a shutoff valve (shutoff valve device) 30 configured to shut off the flow of the gas within the inlet passage 2, by blocking an opening 51 of the valve seat 50.

On the inlet passage 2, the shutoff valve 30 is positioned upstream from the opening 51 of the valve seat 50, and is disposed at a position facing the opening 51. The shutoff valve 30 is configured to block the inlet passage 2 in accordance with a control instruction from the measuring device controller 6. The shutoff valve 30 is attachable to and detachable from the inlet passage 2. A stepping motor is used as a power source for the shutoff valve 30. It should be noted that the configuration and operation of the shutoff valve 30 will be described in detail below.

The outlet passage 4 is a cylindrical pipe for guiding the gas supplied to the consumer to flow from the gas measuring device 1 to the outside. As shown in FIG. 1, the downstream end of the outlet passage 4 is connected to the diaphragm-type flow rate measuring unit 10, and the upstream end of the outlet passage 4 is connected to the outside of the gas measuring device 1.

The diaphragm-type flow rate measuring unit 5 measures the flow rate of the gas within the gas measuring device 1. Although not particularly shown in FIG. 1, the interior of the diaphragm-type flow rate measuring unit 5 includes: two weighing chambers A and B divided by a movable diaphragm; a crank; and a valve. The gas is injected into and discharged from the weighing chambers A and B repeatedly and alternately through movement of the valve. The diaphragm-type flow rate measuring unit 5 measures the flow rate of the gas from the volumes of the weighing chambers A and B and the number of performed operations. Since the principle of weighing by such a diaphragm-type gas meter is known art, a detailed description thereof is omitted.

The measuring device controller 6 performs various control of the gas measuring device 1. The measuring device controller 6 includes the following functional blocks: a measurement processing unit 61; a shut-off instruction unit 62; and a radio unit 63. The measuring device controller 6 is driven by electric power applied from the battery 8.

The measurement processing unit 61 performs various processing on a measurement result of the gas flow rate measured by the diaphragm-type flow rate measuring unit 5. Specifically, for example, the measurement processing unit 61 stores the measured gas flow rate in a memory which is not shown, and outputs the flow rate stored in the memory which is not shown to a display unit which is not shown.

The shut-off instruction unit 62 receives a notification from the radio unit 63, and in response to the notification, instructs the shutoff valve 30 of the shut-off unit 3 to close the valve element.

The radio unit 63 establishes communication with an external radio device through the radio antenna 7. When the radio unit 63 receives from the external radio device an instruction to close the inlet passage 2, the radio unit 63 notifies the shut-off instruction unit 62 of the instruction.

As described above, the gas measuring device 1 according to the present embodiment can measure a gas flow rate by means of the diaphragm-type flow rate measuring unit 5, and the shutoff valve 30 can block the inlet passage 2 in accordance with an instruction from the outside. Accordingly, the gas flowing through the inlet passage 2 can be shut off, which makes it possible to prevent accidents such as gas leakage and gas ignition.

The shut-off unit 3 according to the present embodiment is not a built-in unit of the gas measuring device 1 but attached to the gas measuring device 1 afterwards. For this reason, the entire shutoff valve 30, including components to which a current is applied (e.g., stator 34), is exposed to the gas. Therefore, it is necessary to set a current and voltage applied to the shutoff valve 30 to be in current and voltage value ranges that are specified by intrinsic safety as current and voltage value ranges that do not cause ignition of the gas. Moreover, the inductance of a motor 31 is also set to be in a range specified by intrinsic safety. It should be noted that intrinsic safety is standards tested or confirmed by public institutions as follows: when the intrinsic safety standards are met, sparks occurring in a normal state and at an accident as well as high-temperature portions do not cause ignition of the gas. One specific example of intrinsic safety is European standards, IEC60079-11: 1999, Electrical apparatus for explosive gas atmospheres—Part 11: Intrinsic safety "i". Another specific example of intrinsic safety is Japanese Industrial Standards created based on the above European standards.

Furthermore, the gas measuring device 1 operates with a built-in battery therein, and is required to continue operating (for maximum 20 years) without battery replacement until the time for replacement of the gas meter arrives. For this reason, the shutoff valve 30 needs to be operable with low power consumption.

(Configuration of Shutoff Valve)

Hereinafter, the configuration of the shutoff valve 30 is described in detail with reference to FIG. 2 to FIG. 4. The shutoff valve 30 is compliant to the aforementioned intrinsic safety standards and is configured to be operable with low power consumption.

As shown in FIG. 2, the shutoff valve 30 includes: the motor 31; and a valve element 32 configured to shut off the flow of the gas, the valve element 32 being driven by the motor 31. The shutoff valve 30 further includes a flange portion 36 and a spring 35 between the motor 31 and the valve element 32. The flange portion 36 is used to attach the shutoff valve 30 to a side wall of the inlet passage 2. The spring 35 biases the valve element 32 from the motor 31 side to the valve seat 50 side.

The motor 31 is a power source for allowing the valve element 32 to move. The motor 31 is a stepping motor configured to rotate by a constant angle for every input of a pulse current. As shown in FIG. 2, the motor 31 includes a rotor 33 and the stator 34.

The rotor 33 includes: bearing 40; a circular permanent magnet 44, the outer periphery of which is polarized and magnetized; a metal rotating shaft 45; and a metal lead screw (male screw portion) 46.

The rotating shaft 45 is disposed in a manner to penetrate through the permanent magnet 44 and extend toward the valve element 32. The lead screw 46 is rotatably supported by one end of the rotating shaft 45 via the bearing 40.

The rotating shaft 45 and the lead screw 46 provided at the one end of the rotating shaft 45 are surface-treated. For example, a dry lubricating coating 37 is applied onto the surface of the rotating shaft 45 and the surface of the lead screw 46, and thereby the surface frictional resistance is reduced. The dry lubricating coating 37 herein is a film formed of a solid substance having lubricity. Examples of the solid substance having lubricity include: fluorocarbon resins such as molybdenum disulfide, graphite, mica, and polytetrafluoroethylene; and soft metals. In the shutoff valve 30 according to the present embodiment, the dry lubricating coating 37 formed of a fluorocarbon resin whose particle diameter is approximately four micrometers is applied.

It should be noted that the dry lubricating coating 37 may be applied not only to the lead screw 46 as in the above description. Additionally, the dry lubricating coating 37 may be applied to a lead nut (female screw portion) 49 formed in the valve element 32, into which the lead screw 46 is screwed. The dry lubricating coating 37 may be formed on a contact surface where the lead screw 46 and the lead nut 49 slidingly move.

In order to reduce the frictional resistance as mentioned above, it is conceivable to use not the dry lubricating coating 37 according to the present embodiment but a lubricant such as grease. However, in the present embodiment, the dry lubricating coating is used for the reasons described below. Normally, the shutoff valve 30 according to the present embodiment is left in a state where the shutoff valve 30 does not operate at all. The reason for this is that a situation causing an abnormal state does not frequently occur. However, even in a case where the shutoff valve 30 is left unoperated for a long time, if an abnormal state is detected, the shutoff valve 30 needs to operate properly. Therefore, the dry lubricating coating 37 as described above is more suitable than a liquid lubricant such as grease since the liquid lubricant may possibly become stuck when left for a long time.

The lead screw 46 serving as a male screw is formed of a metal as described above. On the other hand, a valve sheet holder 48, in which the lead nut 49 serving as a female screw is formed, is formed of a synthetic resin. The valve sheet holder 48 will be described below. That is, the material forming the lead screw 46 and the material forming the lead nut 49 are different from each other in terms of a linear expansion coefficient. Accordingly, in a case where a temperature change occurs, there is a possibility that the sliding portion of the lead screw 46 and the sliding portion of the lead nut 49 become locked since the length alternation rate of the lead screw 46 and the length alternation rate of the lead nut 49 when the temperature change occurs are different from each other.

Figure 3A:
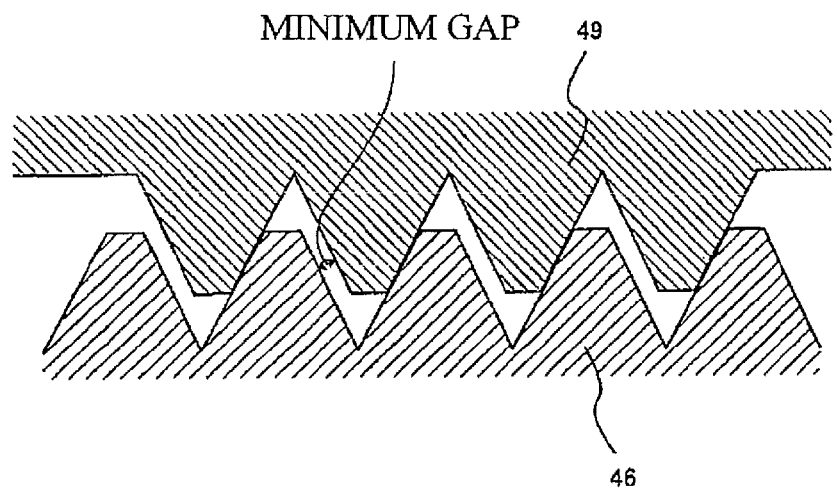
FIG. 3A schematically shows a state where a lead screw and a lead nut included in the shutoff valve according to the embodiment are screwed together.
Figure 3B:
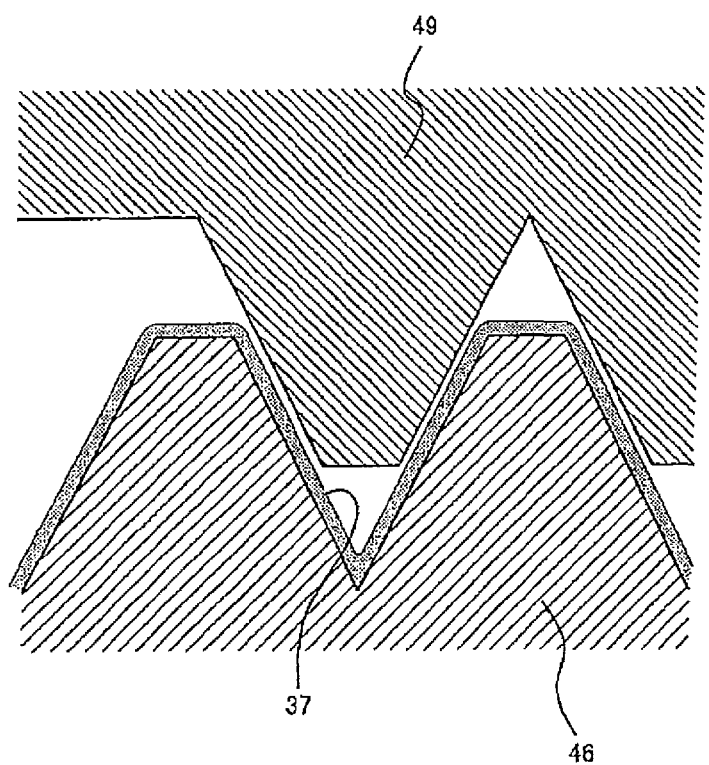
FIG. 3B schematically shows the state where the lead screw and the lead nut included in the shutoff valve according to the embodiment are screwed together.
Figure 4:
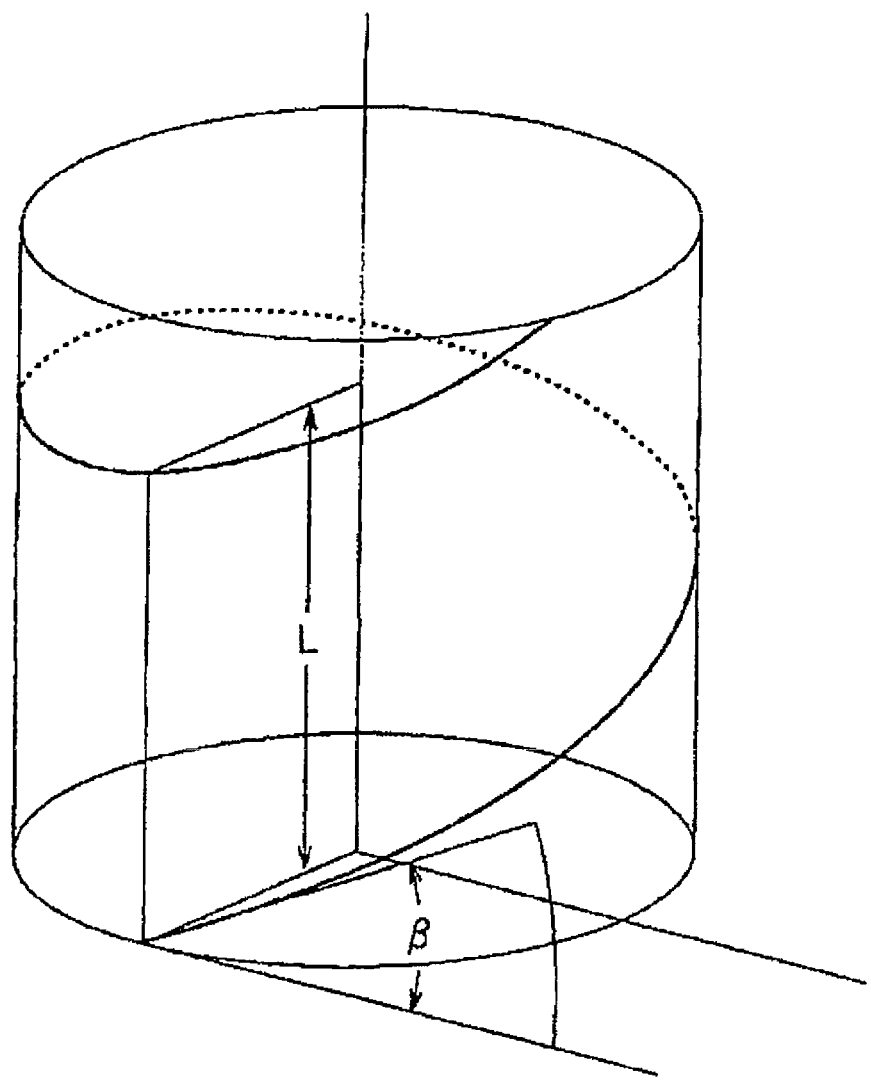
FIG. 4 shows a lead screw thread as a pitch helix, and illustrates a screw lead angle.

In order to prevent a situation where the lead screw 46 and the lead nut 49 become locked and unable to move due to a temperature change, a minimum gap as shown in FIG. 3A is set so that the lead screw 46 and the lead nut 49 will not become locked whatever the combination of the material forming the lead screw 46 and the material forming the lead nut 49 is, so long as the material forming the lead screw 46 and the material forming the lead nut 49 are within the range of materials that are normally expected for use in the shutoff valve 30. In a case where a fluorocarbon resin is used as the dry lubricating coating 37 according to the present embodiment, the fluorocarbon resin to be adopted has a particle diameter smaller than the minimum gap (specifically, four micrometers or smaller). FIGS. 3A and 3B schematically show a state where the lead screw 46 and the lead nut 49 included in the shutoff valve 30 according to the present embodiment are screwed together. For the sake of convenience of the description, FIGS. 3A and 3B schematically show, in an enlarged manner, a portion where the lead screw 46 is screwed into the lead nut 49. FIG. 3B shows an example in which the dry lubricating coating 37 is applied into the gap between the lead screw 46 and the lead nut 49.

The stator 34 is disposed at the outer periphery of the rotor 33, and is configured to interact with the rotor 33, thereby generating a rotation moment. The stator 34 includes: coils 41; an outer electromagnetic yoke 42; and an inner electromagnetic yoke 43.

Each coil 41 is an exciting coil formed such that a conductive wire is wound around a coil bobbin. In the stator 34, the outer electromagnetic yoke 42 and the inner electromagnetic yoke 43 are arranged around the coils 41. Specifically, the outer electromagnetic yoke 42 is provided outside the stator 34 and the inner electromagnetic yoke 43 is provided inside the stator 34, such that the outer electromagnetic yoke 42 and the inner electromagnetic yoke 43 are arranged so as to sandwich the coils 41.

The valve element 32 includes a valve sheet 47 and the valve sheet holder 48. Although not particularly shown in the drawings, the valve element 32 includes a rotation preventer so that the valve element 32 will not rotate together with rotation of the lead screw 46. Specifically, the flange portion 36, which radially extends from the rotating shaft 45, is provided between the motor 31 and the valve element 32. A plurality of protrusions (not shown) are formed on the flange portion 36. Meanwhile, a slit-like rotation preventer is formed in the valve element 32. The slit-like rotation preventer is configured to engage with the protrusions so that the valve element 32 cannot rotate in a rotation direction around the rotating shaft 45. Accordingly, when the lead screw 46 rotates in accordance with the rotation of the rotating shaft 45, the valve element 32 can move in the axial direction of the rotating shaft 45 (lead screw 46) without rotating.

The valve sheet 47 is a valve portion for shutting off the flow of the gas by blocking the opening 51 of the valve seat 50 when the motor 31 causes the valve element 32 to move toward the valve seat 50. The valve sheet 47 is formed of a flexible material such as synthetic rubber. The valve sheet 47 is provided at the end of the valve sheet holder 48 at the opposite side to the motor 31 side. That is, the valve sheet 47 is provided at the end of the valve sheet holder 48 at the valve seat 50 side.

The valve sheet holder 48 is joined to the motor 31 and holds the valve sheet 47. The valve sheet holder 48 is formed of a self-lubricating synthetic resin. To be more specific, the valve sheet holder 48 is formed of a synthetic resin to which a solid lubricant such as polyoxymethylene, polytetrafluoroethylene, carbon graphite, or molybdenum disulfide is added. The lead nut 49 is formed in the valve sheet holder 48. The valve element 32 can be attached to the motor 31 by screwing the lead screw 46 of the motor 31 into the lead nut 49. It should be noted that the valve element 32 is attached to the distal end of the lead screw 46 in a state where the valve element 32 is biased by the spring 35 toward the valve seat 50 side.

(Operations of Shutoff Valve)

Hereinafter, opening and closing operations of the shutoff valve 30 with the above-described configuration are described. It should be noted that a state where the inlet passage 2 is blocked by the shutoff valve 30 and the flow of the gas is shut off is referred to as a valve-closed state, and a state where the inlet passage 2 is open and the flow of the gas is not blocked is referred to as a valve-opened state.

The shutoff valve 30 has a drive mechanism, which is a structure realized by screwing the lead screw 46 supported by one end of the rotating shaft 45 into the lead nut 49 formed in the valve sheet holder 48. The drive mechanism is configured such that the rotational torque of the motor 31 can be directly used as the thrust force of the valve element 32.

In a case where a shut-off instruction to shut off the inlet passage 2 is received from the outside by radio, a current is applied from the battery 8 to the stator 34 in accordance with a control instruction from the measuring device controller 6. That is, a pulse current with a phase difference is applied from the battery 8 to each coil 41 of the stator 34, causing the rotor 33 to rotate in a positive direction. The rotation of the rotor 33 causes the lead screw 46 to rotate in the positive direction. As a result, the valve element 32 moves forward from the motor 31 side to the valve seat 50 side, and the peripheral edge portion of the valve sheet 47 comes into contact with the valve seat 50. Then, the opening 51 is blocked by the valve sheet 47, and thereby the flow of the gas can be shut off at the inlet passage 2. That is, the shutoff valve 30 enters the valve-closed state.

It should be noted that, as described above, the rotation in the positive direction is rotation of the rotor 33 that causes the valve element 32 to move forward from the motor 31 side to the valve seat 50 side. Specifically, the rotation in the positive direction is counterclockwise rotation when the valve seat 50 is seen from the shutoff valve 30.

While the shutoff valve 30 is in the valve-closed state and the application of the current is stopped, the rotor 33 of the shutoff valve 30 is stationary due to detent torque, and the valve element 32 is biased against the valve seat 50 by the spring 35, so that the valve-closed state is maintained.

Upon receiving a returning instruction from the outside by radio, the measuring device controller 6 controls the shutoff valve 30 to be in the valve-opened state.

Specifically, in accordance with a control instruction from the measuring device controller 6, a pulse current with a phase difference is applied from the battery to each coil 41 included in the stator 34 of the shutoff valve 30. Then, the rotor 33 is caused to rotate reversely. The reverse rotation of the rotor 33 causes the lead screw 46 to rotate in a reverse direction. As a result, the valve element 32 moves toward the motor 31 side from the valve seat 50 side, and thereby the opening 51 of the valve seat 50 is opened. Thereafter, in accordance with an instruction from the measuring device controller 6, the application of the current from the battery is stopped. Also while the application of the current is thus stopped, the rotor 33 is stationary due to detent torque, and the shutoff valve 30 maintains the valve-opened state.

It should be noted that the measuring device controller 6 sets the number of pulses and frequency of the pulse current applied to each coil 41, thereby controlling the rotational speed and rotational angle of the rotor 33. That is, a current application module configured to provide an instruction to apply a pulse current to each coil 41, and a changing module configured to change the number of pulses and frequency of the pulse current to be applied, can be realized by the measuring device controller 6.

The term thrust force refers to force that is generated by the rotation of the motor 31 and that pushes the valve element 32 in a direction toward the valve seat 50 or in a direction toward the motor 31 from the valve seat 50. It should be noted that the thrust force in the latter case is greater since the valve element 32 is moved against the gas flow direction.

The thrust force (F) can be represented by Formula (I) below. It should be noted that, in Formula (I), the motor torque of the motor 31 is (T); the screw lead of the lead screw 46 is (L); the thread angle of the lead screw 46 is (α); and the screw lead angle of the lead screw 46 is (β).

$$F = T \cdot 2\pi \cdot \eta / L \quad (1)$$

wherein $$\eta = (\cos(\alpha/2) - \mu \tan \beta)/(\cos(\alpha/2) - \mu \cot \beta) \quad (2)$$

wherein μ indicates a coefficient of dynamic friction.

In the above formulas, the screw lead (L) indicates the amount of movement of the screw in the axial direction when the screw rotates one revolution, and the thread angle (α) is the thread angle of the lead screw 46. Specifically, the thread angle (α) is an angle formed by two adjacent franks, which is measured in a cross-sectional shape including the axis of the lead screw 46. For example, if the lead screw 46 is a parallel thread, then as shown in FIG. 4, the screw lead angle (β) is an angle formed by a pitch helix and a plane, the pitch helix being formed by the thread crest, the plane being perpendicular to the axis of the screw and passing through one point of the pitch helix. As shown in FIG. 4, the screw may be seen as slightly inclined triangular paper being wound around a cylinder (i.e., pitch helix). FIG. 4 shows a lead screw thread as a pitch helix, and illustrates the screw lead angle (β).

It is understood from the relationships shown in Formulas (1) and (2) that the motor torque (T) can be reduced by reducing the values of the screw lead (L) and the coefficient of dynamic friction (μ) while the thrust force (F) is kept constant. Since the motor torque (T) can be reduced while the thrust force (F) is kept constant, consequently, the output of the motor 31 (=current×voltage) can be reduced.

For example, if the lead screw 46 is an M3 screw, then the thread angle (α) is 60°; the diameter of the rotational axis of the lead screw 46 is 3 mm; and the screw lead (L) is 0.5. In this case, β is 3°, accordingly. Here, for example, if μ is 0.2, then η is 0.18. If μ=0.1, then η is 0.31. Thus, the less the coefficient of dynamic friction (μ), the more the value of η. Formula (1) shows that even if the torque (T) is constant, the thrust force (F) can be increased by increasing η. That is, if the thrust force (F) is constant, the motor torque (T) can be reduced.

That is, if Formula (1) is rewritten regarding T, then Formula (3) shown below can be obtained.

$$T = F \times L / (2\pi \cdot \eta) \quad (3)$$

Formula (3) shows that when the thrust force (F) is constant, if the screw lead (L) decreases, then the motor torque (T) decreases, accordingly.

In view of the above, in the shutoff valve 30 according to the present embodiment, the length of the screw lead (L) of the lead screw 46, i.e., the pitch length, is set to be shorter than the length of the screw lead (L) of the lead screw 46 of a commonly used shutoff valve 30. Further, by applying the dry lubricating coating 37, the coefficient of dynamic friction (μ) is reduced. In this manner, the motor torque (T) is reduced, that is, a current and voltage applied to the motor 31 are reduced.

Specifically, the screw lead (L) of the lead screw is 2 mm and the coefficient of dynamic friction is 0.14 in a commonly used shutoff valve. Meanwhile, in a case where the screw lead (L) is 0.5 mm and the coefficient of dynamic friction is 0.04 in the shutoff valve 30 according to the present embodiment, even if the motor torque of the shutoff valve 30 according to the present embodiment is reduced to approximately 25% of the motor torque of the commonly used shutoff valve, the thrust force (F) does not change. That is, with a reduced motor torque, the shutoff valve 30 according to the present embodiment can obtain the same thrust force (F) as the thrust force obtained prior to the reduction of the motor torque, by reducing the screw lead (L) and the coefficient of dynamic friction (μ).

Accordingly, the magnitudes of a current and voltage to be applied to the motor 31 of the shutoff valve 30 can be reduced from the magnitudes of normally applied current and voltage, such that the magnitudes of the current and voltage to be applied to the motor 31 of the shutoff valve 30 fall within respective ranges compliant to the intrinsic safety standards. In addition, even with the voltage of the battery power supply, which is 1.5 V or lower, the valve element 32 can be moved to cause the shutoff valve 30 to enter the valve-closed state.

Figure 5:
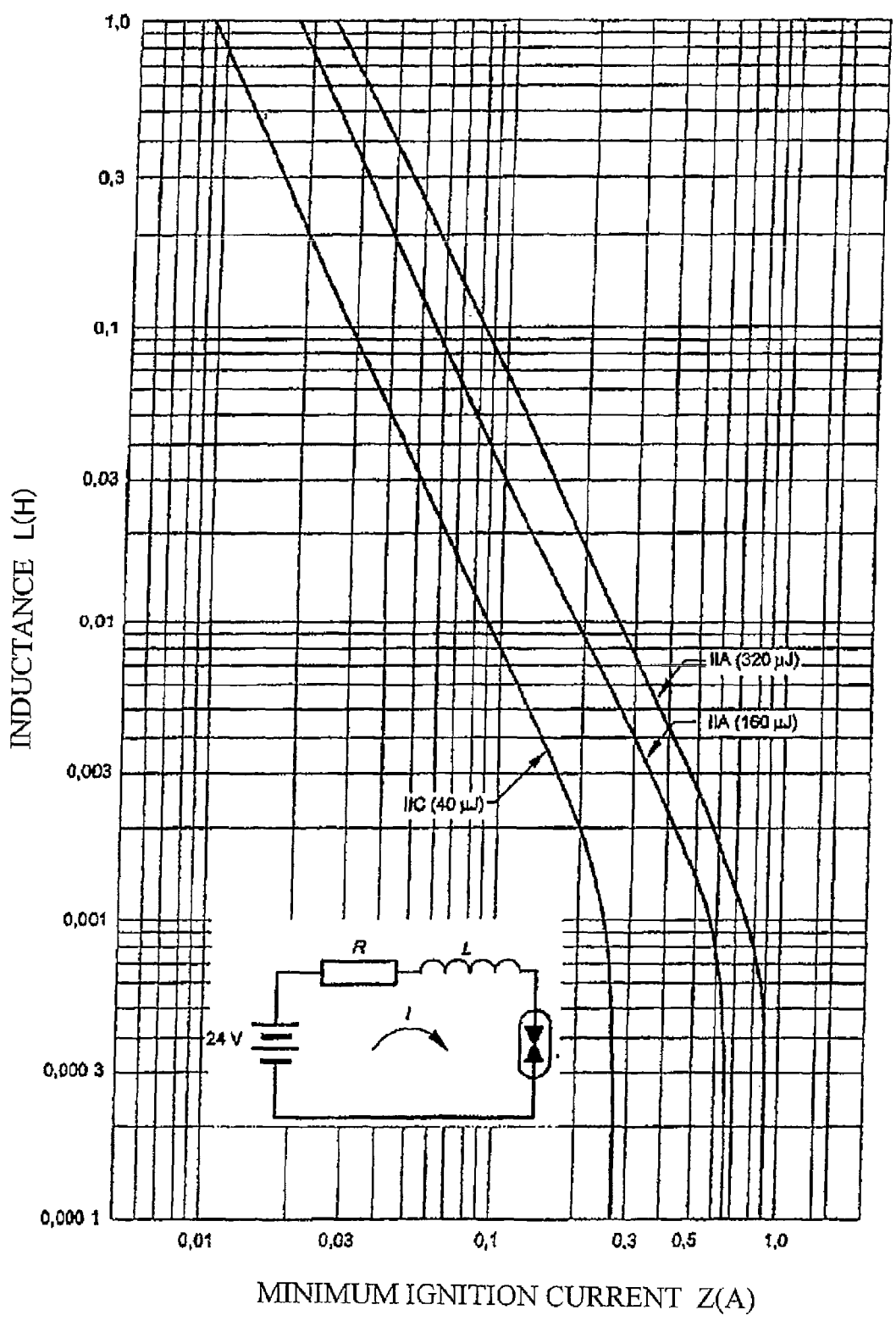
FIG. 5 is a graph showing a relationship between an inductance and a minimum ignition current in an inductive circuit belonging to Group II defined in the IEC60079-11 standards.

For example, as shown in FIG. 5, the intrinsic safety standards (IEC60079-11) define a relationship between an inductance and a minimum ignition current regarding devices including an inductive circuit such as the motor 31 of the shutoff valve 30. FIG. 5 is a graph showing a relationship between an inductance and a minimum ignition current in an inductive circuit belonging to Group II defined in the IEC60079-11 standards. FIG. 5 shows the relationship between the inductance and the minimum ignition current in the inductive circuit in a case where a circuit test voltage is set to 24 V. In FIG. 5, energy levels indicated in brackets (e.g., (320 μJ)) each represent a constant-energy portion of a curve. It should be noted that, in FIG. 5, the region to the left of Curve IIA (320 μJ) is defined as a safe region by the intrinsic safety standards. However, in reality, in order to secure safety increased by 1.5 times, the safe region is set to be smaller than the region to the left of the Curve IIA (320 μJ) in FIG. 5.

Usually, the range of inductance of the stepping motor used in the shutoff valve 30 included in such a gas measuring device as the gas measuring device 1 according to the present embodiment is 5 to 50 mH. Based on the relationship between the inductance and the minimum ignition current shown in FIG. 5, if the inductance range is 5 to 50 mH, then the maximum current value within the intrinsic safety standards is 80 to 250 mA in consideration of securing safety increased by 1.5 times. That is, if the inductance is 5 mH, the current may be 250 mA at a maximum, and if the inductance is 50 mH, the current may be 80 mA at a maximum.

Usually, the resistance value of the internal resistance of the stepping motor used in the shutoff valve 30 included in such a gas measuring device as the gas measuring device 1 according to the present embodiment is 8 to 15Ω. Since the current value within the intrinsic safety standards is approximately 80 to 250 mA, the voltage is in a range from 0.64 to 3.75 V. However, the power source for the gas measuring device 1 according to the present embodiment is a battery whose operating voltage is 1.5 V. Therefore, in reality, a voltage applicable to the motor 31 is in a range from 0.64 to 1.5 V.

As described above, the amount of current that falls within the intrinsic safety standards is determined in relation to the inductance of the stepping motor used in the shutoff valve 30. It should be noted that, in the case of a conventional shutoff valve, if the amount of current applied thereto is limited to fall within a range compliant to the intrinsic safety standards, then the motor torque (T) decreases.

However, as described above, the gas measuring device 1 according to the present embodiment is configured such that the screw lead (L) and the coefficient of dynamic friction (μ) of the shutoff valve 30 are reduced, which allows the gas measuring device 1 according to the present embodiment to maintain the same thrust force as the thrust force of conventional shutoff valves.

The screw lead (L) of a commonly used lead screw is 2 mm. However, in the gas measuring device 1 according to the present embodiment, the screw lead (L) is set between 0.3 to 1 mm. This makes it possible to allow the inductance, current, and voltage to be in the aforementioned ranges compliant to the intrinsic safety standards while maintaining the thrust force (F) of the motor 31.

It should be noted that the screw lead (L) is preferably 0.5 mm in consideration of ease of production of the lead screw 46. In this case, when the lead screw 46 is fabricated, the diameter (screw diameter) of the lead screw 46 becomes approximately 2 to 4 mm. If the screw diameter is 3 mm and the screw lead (L) is 0.5 mm, then the dimensions of the lead screw 46 coincide with those of an M3 screw. This makes the production of the lead screw 46 easier.

A stepping motor such as the motor 31 has characteristics that the motor torque increases in accordance with a decrease in the rotational speed, and the motor torque decreases in accordance with an increase in the rotational speed. Since the rotational speed of the stepping motor can be changed freely, the thrust force can be controlled by controlling the rotational speed. Accordingly, in addition to reducing the values of the screw lead (L) and the coefficient of dynamic friction (μ) as described above, the measuring device controller 6 may be configured to reduce the rotational speed of the motor 31, thereby adjusting the applied current and voltage as well as the inductance to fall within respective ranges specified by the intrinsic safety standards. It should be noted that the ranges specified by the intrinsic safety standards are as follows. As described above, the range of the inductance of the motor 31 is 5 to 50 mH, and the range of the maximum value of the current is 80 to 250 mA. Also, in accordance with the resistance value of the internal resistance of the motor 31, the range of the maximum value of the voltage is 0.64 to 1.5 V.

The lead screw 46 according to the present embodiment is configured such that the screw lead (L) is set within a range from 0.3 to 1 mm so as to satisfy the intrinsic safety standards. As described above, particularly from the standpoint of fabrication of the screw, it is suitable for the screw diameter to be set to 3 mm, for the screw lead (L) to be set to 0.5 mm, and for the screw lead angle (β) to be set to approximately 3°.

Further, as described above, in the shutoff valve 30, the lead screw 46 is screwed into the lead nut 49. The more the number of threads of the lead nut 49, the larger the contact surface between the lead screw 46 and the lead nut 49, resulting in increased joint strength. In this case, however, resistance against the rotational movement of the lead screw 46 is increased.

In order to reduce the resistance, it is desirable to reduce the number of threads formed in the lead nut 49. However, the less the number of threads formed in the lead nut 49, the smaller the contact surface between the lead screw 46 and the lead nut 49, resulting in decreased joint strength. In view of this, in the present embodiment, in order to minimize the number of threads while maintaining necessary joint strength at the contact surface, four threads are formed.

By setting the number of threads to four, the resistance against the rotational movement of the lead screw 46 can be suppressed as much as possible while mainlining the joint strength between the lead screw 46 and the lead nut 49.

Although in the above description a stepping motor is taken as an example of the motor included in the shutoff valve 30, the motor to be included in the shutoff valve 30 is not limited to a stepping motor. That is, the above-described relationship between the inductance and the current shown in FIG. 5 is applicable not only to a stepping motor but also to other types of motors such as a DC motor, for example. Moreover, the above relationships represented by Formulas (1) and (2) are applicable not only to a stepping motor but also to other types of motors.

Hereinafter, variations of the present embodiment are described.

(Variation 1)

Figure 6:
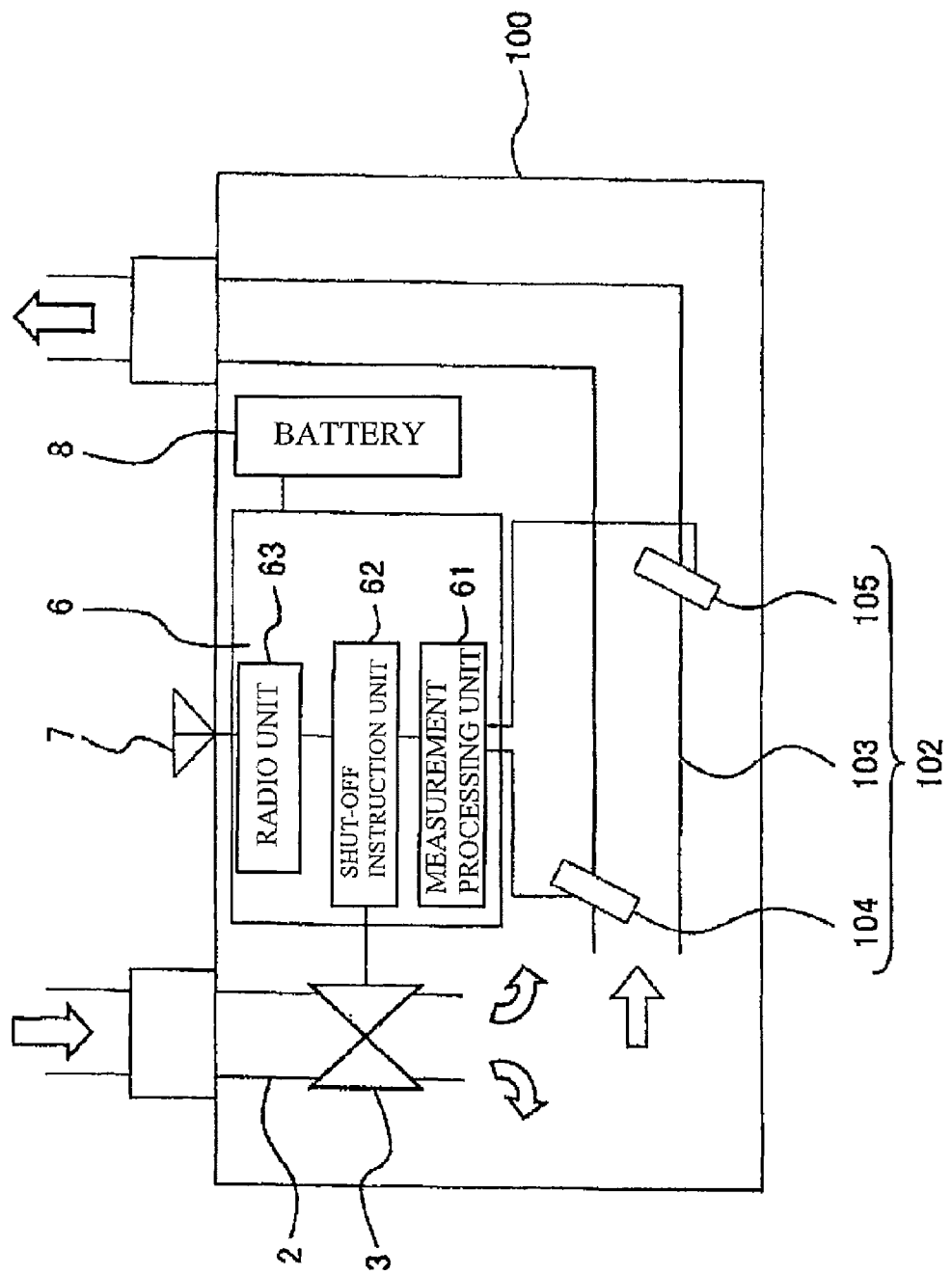
FIG. 6 shows another embodiment of the present invention, and is a schematic diagram showing an example of a main part configuration of a gas measuring device.

Although the gas measuring device 1 according to Embodiment 1 is a diaphragm-type gas meter, the present invention is also applicable to an ultrasonic gas measuring device 100 configured as shown in FIG. 6. It should be noted that FIG. 6 shows another embodiment of the present invention, and is a schematic diagram showing an example of a main part configuration of the gas measuring device 100.

Specifically, as shown in FIG. 6, the gas measuring device 100 includes: an ultrasonic flow rate measuring unit 102 instead of the diaphragm-type flow rate measuring unit 5 included in the gas measuring device 1 shown in FIG. 1. The ultrasonic flow rate measuring unit 102 includes: a measurement passage 103; a first ultrasonic sensor 104; and a second ultrasonic sensor 105.

The measurement passage 103 included in the ultrasonic flow rate measuring unit 102 is a passage for guiding the gas that has flowed from the inlet passage 2 into the gas measuring device 100, such that the gas flows to the outside. As shown in FIG. 6, the measurement passage 103 is provided with the first ultrasonic sensor 104 and the second ultrasonic sensor 105, which are arranged such that the first ultrasonic sensor 104 is positioned upstream from the second ultrasonic sensor 105.

The first ultrasonic sensor 104 and the second ultrasonic sensor 105 transmit and receive ultrasonic waves to and from each other. The first ultrasonic sensor 104 is provided on a side wall of the measurement passage 103 at the upstream side. The second ultrasonic sensor 105 is provided on a side wall of the measurement passage 103 at the downstream side. An ultrasonic wave outputted from the first ultrasonic sensor 104 in response to a drive signal from the measuring device controller 6 advances in a diagonally downward direction through the measurement passage 103 toward the downstream side, thereby propagating toward the second ultrasonic sensor 105. On the other hand, an ultrasonic wave outputted from the second ultrasonic sensor 105 in response to a drive signal from the measuring device controller 6 advances in a diagonally upward direction through the measurement passage 103 toward the upstream side, thereby propagating toward the first ultrasonic sensor 104. Then, the measuring device controller 106 measures an arrival time of each ultrasonic wave, and calculates the flow velocity of the gas flowing through the measurement passage 103 based on a difference between the arrival times.

The measuring device controller 6 performs various control of the gas measuring device 100. The measuring device controller 6 according to Variation 1 is different from the measuring device controller 6 according to Embodiment 1 solely in the following point: the functions of the measurement processing unit 61 of the gas measuring device 100 are different from the functions of the measurement processing unit 61 of the gas measuring device 1 shown in FIG. 1. Specifically, the measurement processing unit 61 included in the gas measuring device 1 has functions of, for example, storing a gas flow rate measured by the diaphragm-type flow rate measuring unit 5 in a memory and outputting the gas flow rate to a display unit. On the other hand, the measurement processing unit 61 included in the gas measuring device 100 shown in FIG. 6 is different from the measurement processing unit 61 included in the gas measuring device 1, in that the measurement processing unit 61 included in the gas measuring device 100 has a function of obtaining a flow velocity and calculating a flow rate in a manner described below.

Specifically, the measurement processing unit 61 obtains a flow velocity from a difference between a time taken by an ultrasonic wave outputted from the first ultrasonic sensor 104 to arrive at the second ultrasonic sensor 105 and a time taken by an ultrasonic wave outputted from the second ultrasonic sensor 105 to arrive at the first ultrasonic sensor 104. Then, the measurement processing unit 61 multiplies the obtained flow velocity by a cross-sectional area of the measurement passage 103 and a correction coefficient, thereby obtaining a flow rate.

Also in the ultrasonic gas measuring device with the above-described configuration, the shut-off unit 3 may be provided at a downstream-side end portion of the inlet passage 2 by utilizing empty space between the inlet passage 2 and the measurement passage 103.

The gas measuring device 1 according to Embodiment 1 and the gas measuring device 100 according to Variation 1 of Embodiment 1 are configured to shut off the inlet passage 2 by means of the shutoff valve 30 in accordance with an instruction provided from the outside by radio. However, the present embodiment is not thus limited.

For example, an abnormality detection sensor may be included in the measurement passage 103. In this case, the measuring device controller 6 may be configured to determine presence or absence of an abnormality from a result of the sensing by the sensor, and shut off the inlet passage 2 by means of the shutoff valve 30 in accordance with the determination result. The term abnormality refers to, for example, an abnormality in gas flow rate or an earthquake. In the case of detecting a gas flow rate abnormality, the abnormality detection sensor may be realized by a pressure sensor configured to measure the pressure of the gas flowing through the measurement passage 103. In the case of detecting an earthquake, the abnormality detection sensor may be realized by a seismic sensor configured to detect seismic vibration.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The shutoff valve device according to the present invention is to be included in a flow rate measuring device configured to measure the flow rate of a fuel gas flowing through a passage, and is useful for shutting off the passage when necessary.

The invention claimed is:

1. A flow rate measuring device configured to measure a flow rate of a fuel gas flowing through a passage and including a shutoff valve device serving to shut off the passage, the measuring device comprising:
   a device controller;
   a stepping motor that rotates a rotating shaft, the stepping motor including a stator having a plurality of coils and configured to rotate by a constant angle depending upon an applied pulse current;
   a male screw portion on the rotating shaft, the device controller configured to set the number of pulses and frequency of the pulse current applied to each of the coils to control a rotation speed and a rotation angle of the rotating shaft; and
   a valve element configured to block the passage, the valve element including a female screw portion accommodating the male screw portion, the valve element moving in an axial direction in accordance with rotation of the rotating shaft,
   wherein a dry lubricating coating resides on a contact surface of the male screw portion and the female screw portion, and a thread pitch of the male screw portion is a in a range from 0.3 to 1 mm, such that the pulse current applied to the motor by the device controller, in relation to an inductance of the motor, is in a range that does not cause explosion of the fuel gas and that allows a thrust force necessary for moving the valve element to be obtained,
   wherein the device controller adjusts the rotational speed of the motor thereby adjusting the applied pulse current, voltage and inductance to be within intrinsic safety standards.

2. The measuring device according to claim 1, wherein the inductance of the motor has a range of 5 to 50 mH, and a maximum value of the current applied to the motor by the controller has a range from 80 to 250 mA.

3. The measuring device according to claim 1, wherein the dry lubricating coating comprises a fluorocarbon resin having a particle diameter that is smaller than a gap between a male screw thread and a female screw thread at the contact surface.

4. The measuring according to claim 1, wherein the device controller further comprises:
   a current application module that applies the pulse current to the motor; and
   a changing module that changes a rotational speed of the motor by changing a number of pulses and a frequency of the pulse current applied by the current application module.

5. A flow rate measuring device configured to measure a flow rate of a fuel gas flowing through a passage, and including a shutoff valve device serving to shut off the passage, the measuring device comprising:
   a device controller;
   a motor that rotates a rotating shaft;
   a male screw portion on the rotating shaft, the device controller controlling a rotation speed and a rotation angle of the rotating shaft; and
   a valve element configured to block the passage, the valve element including a female screw portion accommodating the male screw portion, the valve element moving in an axial direction in accordance with a rotation of the rotating shaft, wherein a dry lubricating coating resides on a contact surface of the male screw portion and the female screw portion, an inductance of the motor has a range from 5 to 50 mH, and a resistance value of an internal resistance of the motor has a range from 8 to 15 Ω, and based on the range of the inductance and the range of the resistance value, a maximum value of a current applied to the motor by the controller has a range from 80 to 250 mA, which does not cause explosion of the fuel gas and allows a thrust force necessary for moving the valve element, and a thread pitch of the male screw portion has a range from 0.3 to 1 mm.

6. The measuring device according to claim 5, wherein the dry lubricating coating comprises a fluorocarbon resin having a particle diameter that is smaller than a gap between a male screw thread and a female screw thread at the contact surface.

7. The measuring device according to claim 5, wherein the motor comprises a stepping motor, and the device controller further comprises:
   a current application module that applies a pulse current to the motor; and
   a changing module that changes a rotational speed of the motor by changing the number of pulses and frequency of the pulse current applied by the current application module.

* * * * *